(12) United States Patent
Olim

(10) Patent No.: US 6,609,529 B2
(45) Date of Patent: Aug. 26, 2003

(54) METHOD AND APPARATUS FOR CLEANING DISC DRIVE COMPONENTS

(75) Inventor: Moshe Olim, Eden Prairie, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 52 days.

(21) Appl. No.: 09/870,907

(22) Filed: May 31, 2001

(65) Prior Publication Data

US 2001/0050831 A1 Dec. 13, 2001

Related U.S. Application Data

(60) Provisional application No. 60/208,886, filed on Jun. 2, 2000.

(51) Int. Cl.$^7$ .................................................. B08B 5/00
(52) U.S. Cl. ........................... 134/25.4; 134/31; 134/37; 134/149; 134/157; 134/902
(58) Field of Search ........................ 134/25.4, 33, 34, 134/37, 115 R, 138, 149, 157, 902

(56) References Cited

U.S. PATENT DOCUMENTS

| | | | |
|---|---|---|---|
| 3,517,642 A | 6/1970 | David ............................ | 118/7 |
| 3,731,291 A | 5/1973 | Walsh ...................... | 340/174.1 |
| 4,489,740 A | 12/1984 | Rattan et al. ............... | 134/140 |
| 4,558,386 A | 12/1985 | Kara .......................... | 360/128 |
| 4,889,564 A | 12/1989 | Kikuchi et al. ............... | 134/21 |
| 4,916,564 A | 4/1990 | Fritsch ....................... | 360/128 |
| 5,119,256 A | 6/1992 | NakaMats ................... | 360/128 |
| 5,136,438 A | 8/1992 | Wakatsuki et al. ............ | 360/69 |
| 5,231,622 A | 7/1993 | Hayashi ....................... | 369/73 |
| 5,850,321 A | 12/1998 | McNeil et al. .............. | 360/106 |
| 6,021,785 A | 2/2000 | Grutzediek et al. .......... | 134/1.3 |
| 6,050,276 A | 4/2000 | Harada et al. ............... | 134/121 |

FOREIGN PATENT DOCUMENTS

| | | |
|---|---|---|
| JP | 61-129721 | 6/1986 |
| JP | 62-008333 | 1/1987 |
| JP | 63-191311 | 8/1988 |
| JP | 1-149211 A2 | 6/1989 |

OTHER PUBLICATIONS

"Process for Substrate Cleaning", by D. Mattox, *Handbook of Thin Film Process Technology*, pp. E1.0:1–E1.0:26, 1996.
Written Opinion dated Sep. 17, 2002 from the International Preliminary Examining Authority for International Application No. PCT/US01/17518 filed May 31, 2001.
"Notification of Transmittal of the International Search Report or the Declaration", PCT/US01/17518.

*Primary Examiner*—Frankie L. Stinson
(74) *Attorney, Agent, or Firm*—Westman, Champlin & Kelly

(57) ABSTRACT

An apparatus adapted to clean an exposed surface of a microstructure device such as a disc or head for a disc drive. The apparatus includes a fixture with a mounting surface adapted to receive the microstructure device. A cleaning fluid covers the exposed surface. A slider bearing coupled to a resilient mount flies over the exposed surface. A cleaning line on the exposed surface adjacent the slider bearing is subject to flow of the cleaning fluid. The flow can be generated by relative motion between the device and the slider bearing or generated by a nozzle.

23 Claims, 5 Drawing Sheets

METHOD AND APPARATUS FOR CLEANING DISC DRIVE COMPONENTS

CROSS-REFERENCE TO RELATED APPLICATION

This application claims priority benefits from U.S. Provisional Application 60/208,886 titled "Particle removal from discs and wafers," filed Jun. 2, 2000.

FIELD OF THE INVENTION

The present invention relates to disc drive data storage devices. In particular the present invention relates to cleaning discs and wafers used in making disc drives.

BACKGROUND OF THE INVENTION

In disc drive storage devices, as well as other technologically advanced devices such as LCD plates, there are surfaces that include micromechanical structures at or near the surfaces that are subject to damage. For example, discs have a thin layer of magnetic material at a sliding disc surface and read/write heads have various magnetic and insulating components formed at a sliding head surface. When particles adhere to the sliding surfaces, the particles can be broken loose by the sliding action and damage delicate micromechanical structures on one or both sliding surfaces.

Cleaning techniques are available for effectively removing larger particles. For example, burnish heads, ultrasonic and megasonic cleaning have been used. However, burnish heads can break up particles into smaller particles which also adhere to the sliding surface. Ultrasonic or megasonic cleaning would have to use unacceptable amounts of power in order to get high enough pressure gradients to remove small particles. As areal densities of disc drives increase, the critical dimension between sliding components is becoming smaller and approaching 5 nanometers in some applications. A method and apparatus are needed that can clean extremely small particles from micromechanical sliding surfaces without damaging the micromechanical structures that are at or near the sliding surfaces during the cleaning process.

SUMMARY OF THE INVENTION

Disclosed is a method and an apparatus adapted to clean an exposed surface of a microstructure device such as a disc or head for a disc drive. The apparatus includes a fixture with a mounting surface adapted to receive the microstructure device. A cleaning fluid covers the exposed surface.

A slider bearing coupled to a resilient mount flies over the exposed surface. A cleaning line on the exposed surface adjacent the slider bearing is subject to a flow of the cleaning fluid. The flow can be generated by relative motion between the microstructure device and the slider bearing or generated by a nozzle.

Additional features and benefits will become apparrent with a careful review of the following detailed description and the corresponding drawings.

DETAILED DESCRIPTION

In the embodiments described below, a cleaning apparatus cleans extremely small particles from exposed surfaces of microstructure devices such as disc drive sliders and discs. The microstructure devices are secured to mounting surfaces in the apparatus and a cleaning fluid covers the exposed surface. A slider bearing on a resilient mount is disposed over the exposed surfaces. Cleaning lines are formed on the exposed surfaces adjacent the slider bearings. The cleaning lines are then subjected to flow of the cleaning fluid. The flow can be generated by relative motion between the microstructure device and the slider bearing or generated by a nozzle. A boundary layer on the exposed surfaces is disturbed by the flow at the cleaning line and particles are efficiently removed.

Figure 1:
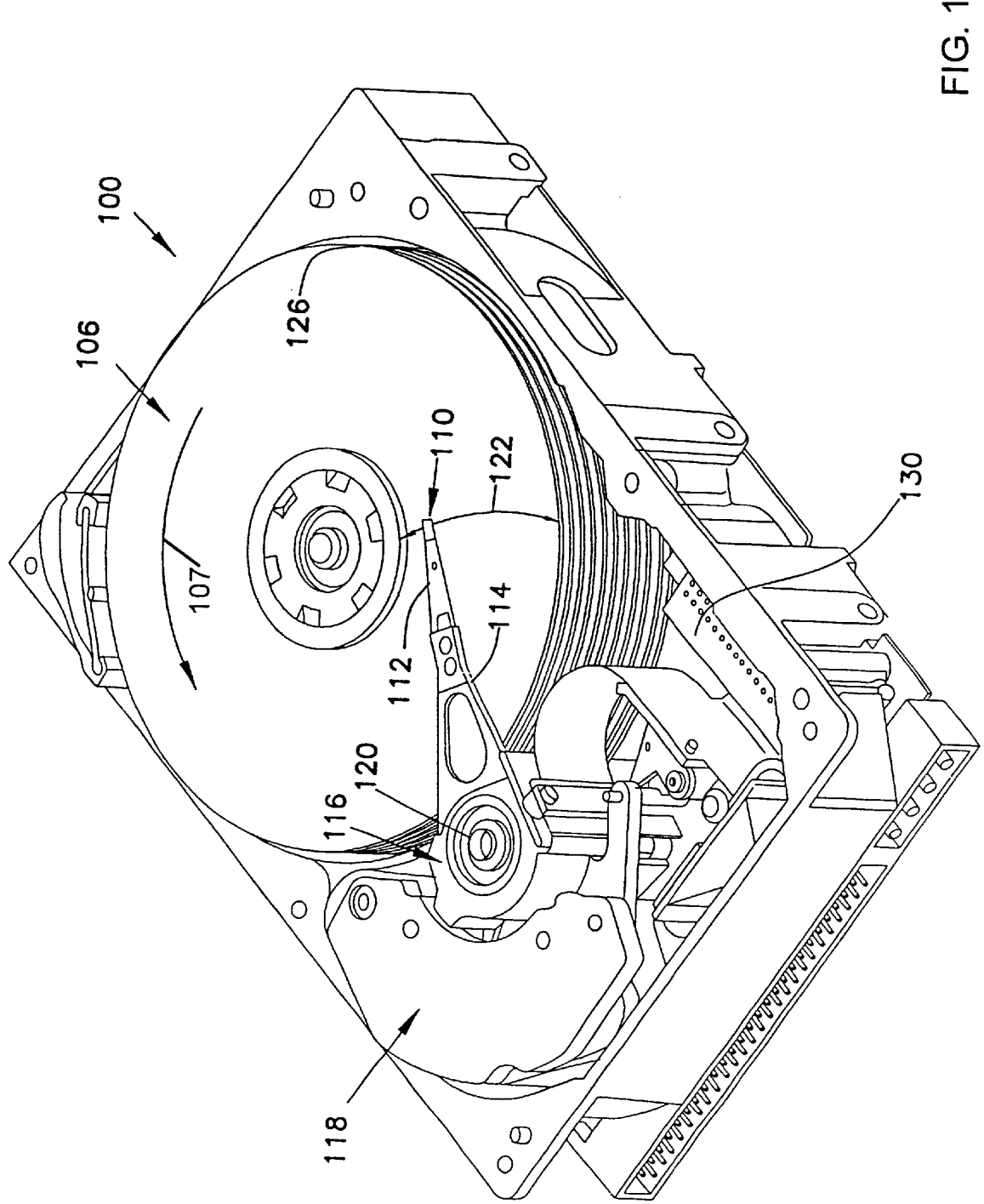
FIG. 1 illustrates a disc drive storage device.

In FIG. 1, an embodiment of a disc drive storage device 100 is illustrated. Disc drive 100 includes a disc pack 126 having storage surfaces 106 that are typically layers of magnetic material that are deposited using microstructure fabrication techniques. The disc pack 126 includes a stack of multiple discs and the read/write head assembly 112 includes a read/write transducer or head 110 for each stacked disc. The head 110 is typically formed using microstructure fabrication techniques. Disc pack 126 is spun or rotated as shown by arrow 107 to allow read/write head assembly 112 to access different rotational locations for data on the storage surfaces 106 on the disc pack 126.

Read/write head assembly 112 is actuated to move radially, relative to the disc pack 126, as shown by arrow 122 to access different radial locations for data on the storage surfaces 106 of disc pack 126. Typically, the actuation of read/write head assembly 112 is provided by a voice coil motor 118. Voice coil motor 118 includes a rotor 116 that pivots on axle 120 and an arm 114 that actuates the read/write head assembly 112. Disc drive 100 includes electronic circuitry 130 for controlling the operation of the disc drive 100 and transferring data in and out of the disc drive.

Typically, the disc drive head 110 slides over the storage surface 106 in the disc drive 100 as illustrated. If there are particles of a large enough dimension between the sliding surfaces, then there is an increased risk that one of the sliding surfaces may be damaged during operation. In modern disc drives a critical dimension can approach 5 nanometers between the head 110 and the storage surface 106. Particles can cause damage and need to be removed from the sliding surfaces before assembly of the disc drive 100. Methods and apparatus for cleaning the sliding surfaces are described below in connection with FIGS. 2–7.

Figure 2:
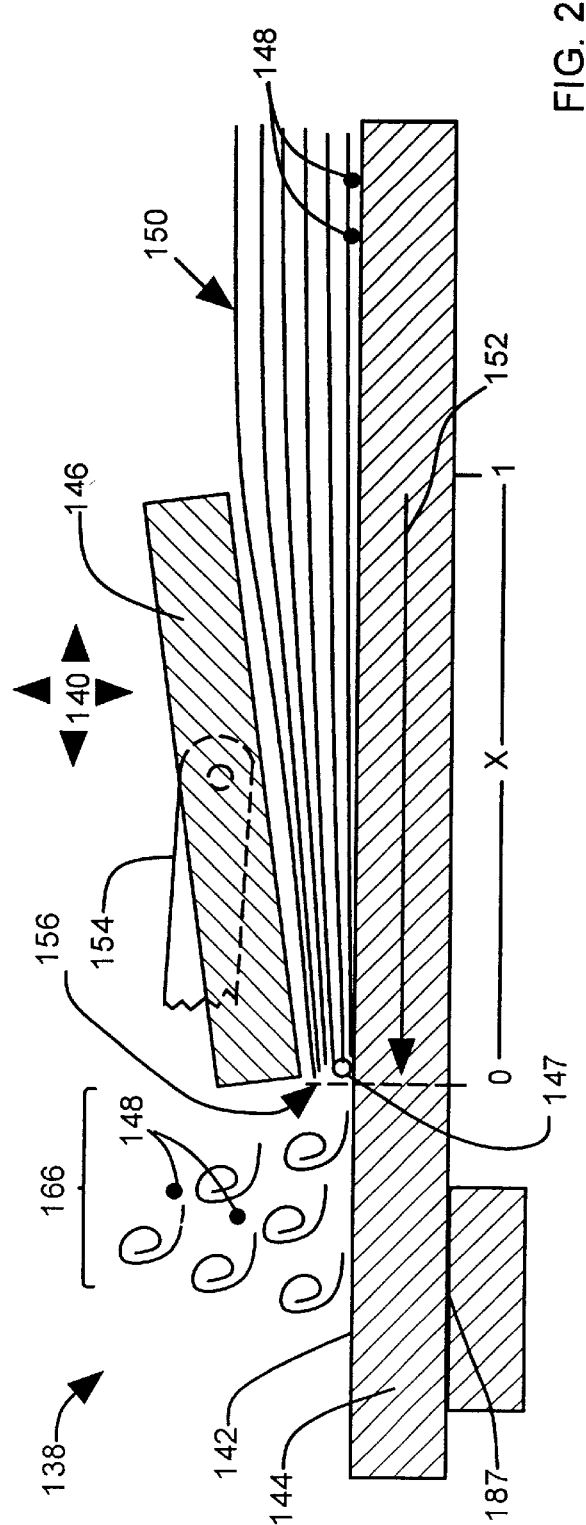
FIG. 2 illustrates fluid flow of a cleaning fluid between an exposed surface of a microstructure device and a slider bearing.

FIG. 2 illustrates a portion of a cleaning apparatus 138. A cleaning fluid 140 flows around an exposed surface 142 of a microstructure device 144 and around a slider bearing 146 during a cleaning operation. Cleaning fluid 140 can be a clean gas such as air or dry nitrogen, or it can be a liquid cleaning fluid. Cleaning fluid 140 is drawn over the microstructure device 144 at a relatively slow rate to carry away particles 148 as they are dislodged as explained in more detail below. The cleaning apparatus in FIG. 2 is used to remove the extremely small particles 148 from exposed surface 142 before the microstructure device 144 (or a portion of the microstructure device) is installed in a disc drive.

Microstructure device 144 is a sliding disc drive component such as a disc or a substrate with an array of disc drive heads. Exposed surface 142 is a surface that, after assembly of a disc drive, will slide over another surface during operation of the disc drive. The exposed surface 142 is formed by microstructure fabrication techniques such as lapping, sputtering, chemical vapor deposition, epitaxy, evaporation or the like. Microstructure fabrication processes or associated handling and storage of the microstructure device 144 can leave the extremely small particles 148 adhered to the exposed surface 142. The particles 148 adhere strongly to exposed surface 142 and are difficult to remove. These particles 148 are so small that they remain embedded in a boundary layer 150 of the cleaning fluid 140, even when there is fluid flow above the exposed surface 142. As is well known, flow velocities in a boundary layer such as the boundary layer 150 are relatively low in relation to exposed surface 142 in spite of the fact that there may be considerable flow velocity a short distance away from the boundary layer 150. A way is needed to disturb the relatively stationary boundary layer 150, and provide high velocity flow of cleaning fluid at the exposed surface 142 to remove the particles 148.

As illustrated at 152, the microstructure device 144 is rapidly moved or spun relative to the slider bearing 146. Mircrostructure device 144 is secured on a fixture 187 that spins the microstructure device 144. A mounting arm 154 subjects the slider bearing 146 to a resilient force urging the slider bearing 146 toward the exposed surface 142. Flow induced by the relative motion between the microstructure device 144 and the slider bearing 146 forces the boundary layer 150 to pass through a narrow gap 156 between the the slider bearing 146 and the exposed surface 142.

Figure 3:
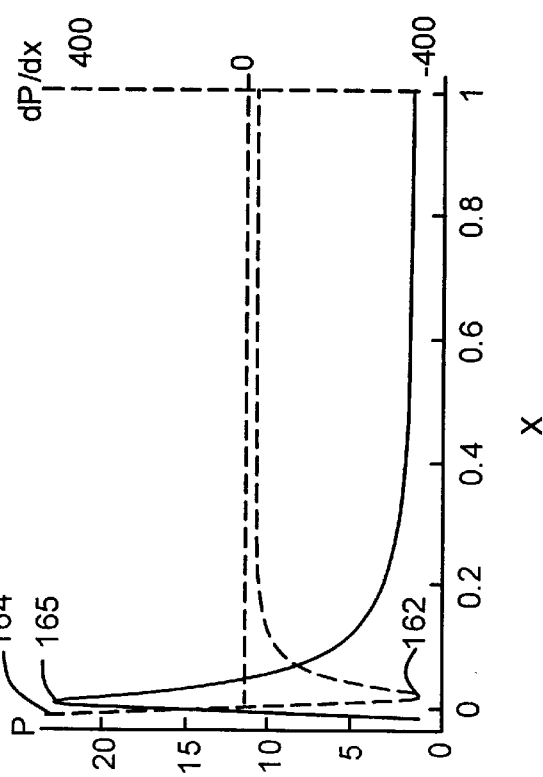
FIG. 3 illustrates pressures and pressure gradients under the slider bearing in FIG. 2.

As illustrated in FIG. 3, the pressure P in the cleaning fluid 140 at 165 increases greatly at the narrow gap 156. The rate of change of pressure dP/dX increases in a turbulent wake 166 beyond the gap as illustrated at 164. In FIG. 3, the horizontal axis X represents position along the exposed surface 142 under the slider bearing 146. The solid vertical axis P represents pressure and the dashed vertical axis dP/dX represents pressure gradient.

The increased pressure P at 165 (near X=0) generates a force that tends to lift the slider bearing 146 a small distance away from the exposed surface 142. Slider bearing 146 is able to move because it is resiliently mounted. The boundary layer 150 is forced through the narrow gap at 156 resulting in the desired high flow rates in the cleaning fluid which scrub the particles off of the exposed surface 142 along a cleaning line 147. The flow of cleaning fluid at 156 disturbs the boundary layer 150 and comes extremely close to the exposed surface 142. The particles 148 are entrained in the turbulent wake 166 behind the slider bearing 146 and carried away by the slow flow of cleaning fluid over the cleaning apparatus. In the case of liquid cleaning fluids, a static pressure is maintained on the cleaning fluid to reduce or eliminate any cavitation that might damage the exposed surface 142.

The pressurized boundary layer at the trailing edge (at 156) generates high pressure gradients. The magnitude of these gradients can be estimated from an analytical solution of Reynolds equation. For example, a plane wedge slider bearing in air with a bearing number of $1\times10^4$, a bearing length of 1 centimeter, Hmax/Hmin=200 and Hmin=1 micron, generates a force on a particle that is on the order of $1\times10^{11}$ $D^3$ Newtons, where D is the diameter of the particle in meters. The "bearing number" is equal to $(6 \mu U L)/(h^2 P)$ where $\mu$ is the viscosity of the cleaning fluid, U is the relative velocity between the disc and the slider bearing, L is the slider bearing length and h is the minimum distance between the disc and the slider bearing, and P is the ambient pressure. This force is approximately two orders of magnitude larger than the forces that are generated with commercially available megasonic cleaning equipment. Cleaning using a slider bearing has the potential to be even more efficient than megasonic cleaning.

In FIGS. 4–7 below, features that are the same as or similar to features in FIG. 2 are identified with the same reference numbers.

Figure 4:
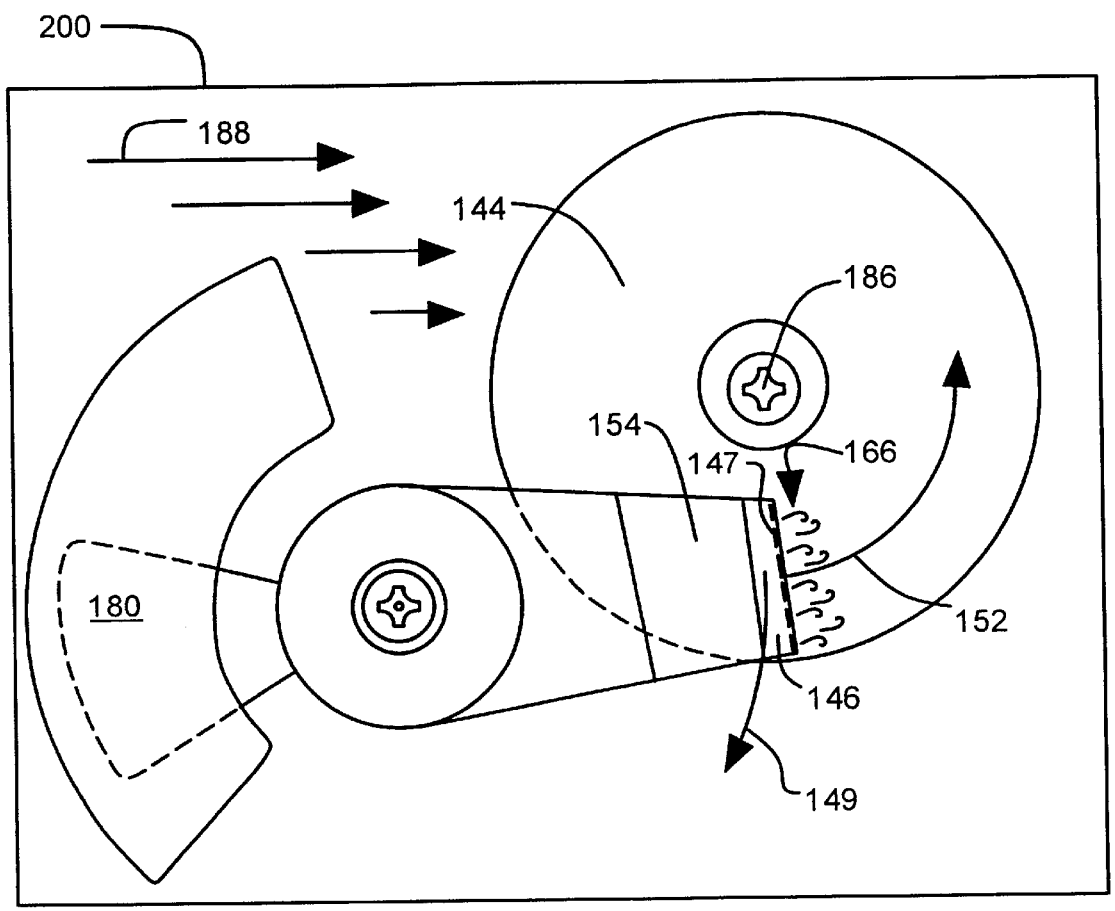
FIGS. 4–5 illustrate a first embodiment of an apparatus adapted to clean multiple exposed surfaces.
Figure 5:
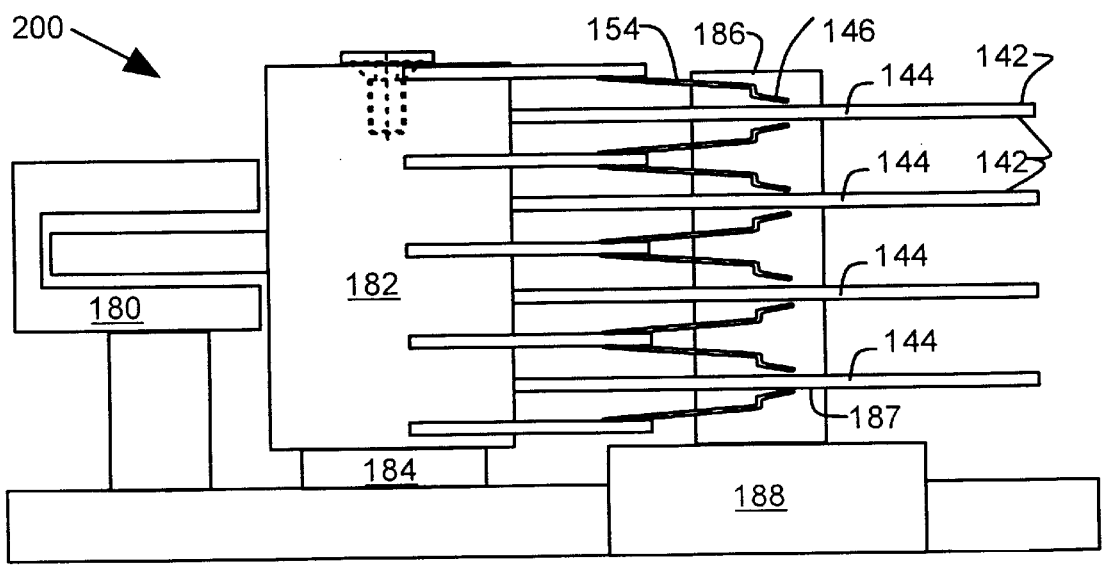

FIGS. 4–5 illustrate a first embodiment of an apparatus 200 adapted to clean exposed surfaces 142. Apparatus 200 is arranged to clean multiple exposed surfaces 142 of microstructure devices 144. The arrangement of apparatus 200 is similar to that of a disc drive. As illustrated in FIGS. 4–5, microstructure devices 144 are discs for a disc drive, however, a vacuum chuck plate such as the one illustrated in FIG. 6 can be installed instead of discs. The microstructure device 144 are secured on multiple surfaces 187 of a fixture 186. Fixture 186 is a drive shaft of a servomotor 188 that is used to spin the drive shaft. The apparatus 200 is immersed in a bath of cleaning fluid 188 that is slowly moving as indicated by arrows to carry away dislodged particles.

The slider bearings 146 are coupled to the resilient mountings 154 over the exposed surfaces 142. The microstructure devices 144 are spun by servomotor 188. The microstructure devices 144 move as indicated by arrow 152, generally perpendicular to the slider bearings 146 and cleaning line 147. This relative motion provides flow of the cleaning fluid along the dashed cleaning line 147 on the exposed surfaces 142 adjacent the slider bearings 146. As the microstructure devices 144 spin, the cleaning lines 147 move over the exposed surfaces 142 along a line generally perpendicular to the cleaning line 147. Substantially all of areas of surfaces 142 are swept clean by the high flows at the cleaning lines 147. Turbulent wakes 166 follow the cleaning lines 147 and are carried away by the slow flow of cleaning fluid 188 over the apparatus 200.

When cleaning is complete, the slider bearings 146 and the resilient mountings 154 are moved from an operating position (as illustrated in FIG. 4) over the exposed surface to a second position out of the way of the exposed surfaces 142 as indicated by arrow 149. The resilient mounts 154 are attached to a hub 182 that pivots on an axle 184. The movement is driven by a voice coil motor 180 in a manner similar to a disc drive. This movement allows for convenient installation and removal of the microstructure devices 144.

Figure 6:
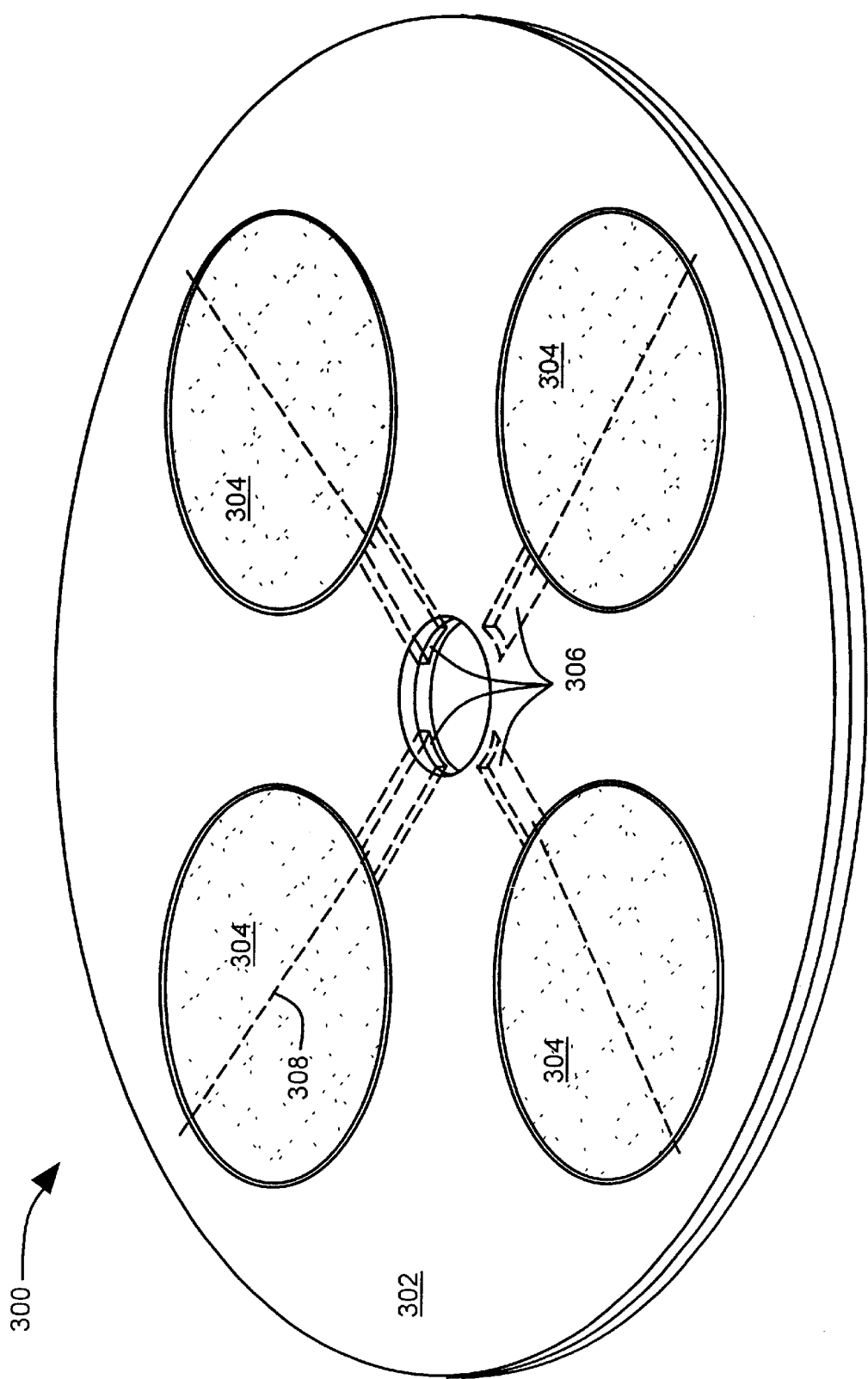
FIG. 6 illustrates a vacuum chuck plate securing multiple substrates that each include an array of disc drive heads.

FIG. 6 illustrates an assembly 300 that includes a vacuum chuck plate 302 and multiple substrates 304 including arrays of disc drive heads. The multiple substrates 304 are secured to the vacuum chuck plate 302 by application of a vacuum under the substrates 304. The vacuum is provided from a central plenum shaft (not illustrated) via vacuum passageways 306. The assembly 300 can be loaded into an apparatus such as apparatus 200 of FIGS. 4–5. Once loaded into an apparatus 200, a cleaning line 308 is formed and swept around the plate 302 to clean the multiple substrates 304.

Assembly 300 can also be loaded into an apparatus such as apparatus 400 illustrated below in FIG. 7.

Figure 7:
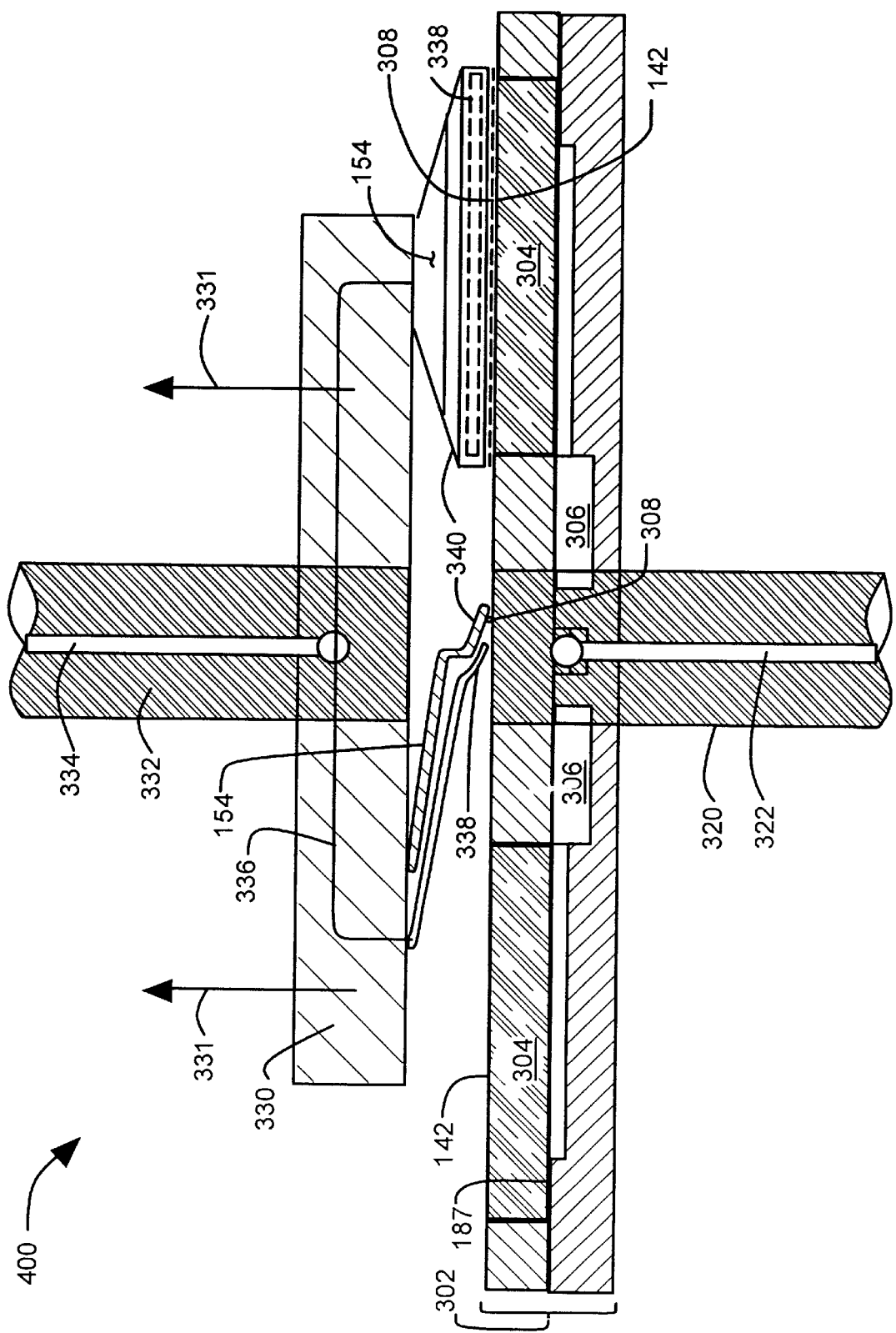
FIG. 7 illustrates a second embodiment of an apparatus adapted to clean multiple exposed surfaces.

FIG. 7 illustrates a second embodiment of an apparatus 400 adapted to clean exposed surfaces 142 of micromechanical devices 304 secured to the vacuum chuck plate 302 as shown in FIG. 6. The vacuum chuck plate 302 is mounted on a shaft 320. Shaft 320 is arranged to be slowly rotated during a cleaning process to move multiple cleaning lines 308 over the exposed surfaces 142. Shaft 320 includes an internal passageway 322 that provides vacuum to the vacuum passageways 306 in vacuum chuck 302. A movable mounting plate 330 is mounted on a shaft 332. Mounting plate 330 can be in a cleaning position as illustrated or can be moved away as illustrated by lines 331 to permit convenient loading and unloading of micromechanical devices 304 in the chuck plate 302. Shaft 332 includes an internal passageway 334 that delivers highly pressurized cleaning fluid to a passageway 336 in the mounting plate 330. Passageway 336 couples the highly pressurized cleaning fluid to four nozzles 338 that are arranged beneath four slider bearings 340. For clarity, only two of the four arrangements of slider bearings 340 are illustrated in FIG. 7. Flow of the cleaning fluid 140 is generated by the pressurized nozzles 338 disposed between the slider bearings 340 and the exposed surfaces 142. In FIG. 7, no high speed relative motion is needed between the slider bearings 340 and the exposed surfaces 142.

In summary, an apparatus (138, 200, 400) is adapted to clean an exposed surface (142) of a microstructure device (144, 304). The apparatus (138, 200, 400) includes a fixture (186, 302) having a mounting surface (187) adapted to secure the microstructure device (144, 304). A cleaning fluid (140, 188) covers the exposed surface (142). A slider bearing (146, 340) is disposed over the exposed surface (142). A resilient mount (154) couples to the slider bearing (146, 340). A cleaning line (147, 308) is present on the exposed surface (142) adjacent the slider bearing (146, 340). The cleaning line (147, 308) is subject to flow of the cleaning fluid (140, 188).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the microstructure device while maintaining substantially the same functionality without departing from the scope and spirit of the present invention. In addition, although the preferred embodiment described herein is directed to microstructure devices for a disc drive storage system, it will be appreciated by those skilled in the art that the teachings of the present invention can be applied to other microstructure devices, like LCD panels or silicon or gallium arsenide semiconductor integrated circuit wafers, without departing from the scope and spirit of the present invention.

What is claimed is:

1. A method of cleaning particles from a boundary layer on an exposed surface of a microstructure device, comprising:
    A. securing the microstructure device on a fixture with the exposed surface immersed in a cleaning fluid;
    B. mounting a slider bearing on a resilient mounting over the exposed surface to form a gap between the slider bearing and the exposed surface; and
    C. providing flow of the cleaning fluid through the gap along a cleaning line on the exposed surface adjacent the slider bearing to generate a turbulence in the boundary layer, dislodging the particles from the boundary layer.

2. The method of claim 1, further comprising:
    D. moving the microstructure device relative to the slider bearing along a motion line that is generally perpendicular to the cleaning line.

3. The method of claim 1 wherein the exposed surface is a sliding surface of a microstructure device for use in a disc drive.

4. The method of claim 3 wherein the microstructure device comprises an array of disc drive heads on a substrate.

5. The method of claim 3 wherein the resilient mounting is movable from a first position over the exposed surface to a second position away from the exposed surface.

6. The method of claim 1 wherein the flow of the cleaning fluid is generated by relative motion between the slider bearing and the exposed surface.

7. A method of cleaning an exposed surface of a microstructure device, comprising:
    A. securing the microstructure device on a fixture with the exposed surface immersed in a cleaning fluid;
    B. mounting a slider bearing on a resilient mounting over the exposed surface;
    C. providing flow of the cleaning fluid along a cleaning line on the exposed surface adjacent the slider bearing; and
    D. generating the flow of the cleaning fluid by a pressurized nozzle disposed between the slider bearing and the exposed surface.

8. A method of cleaning an exposed surface of a microstructure device, comprising:
    A. securing the microstructure device on a fixture with the exposed surface immersed in a cleaning fluid;
    B. mounting a slider bearing on a resilient mounting over the exposed surface;
    C. providing flow of the cleaning fluid along a cleaning line on the exposed surface adjacent the slider bearing; and
    D. wherein the cleaning fluid is a liquid subjected to a static pressure during cleaning sufficient to prevent cavitation.

9. An apparatus adapted to clean particles from a boundary layer on an exposed surface of a microstructure device, comprising:
    a fixture having a mounting surface adapted to secure the microstructure device;
    a cleaning fluid covering the exposed surface;
    a slider bearing disposed over the exposed surface to form a gap between the slider bearing and the exposed surface;
    a resilient mount coupled to the slider bearing; and
    a cleaning line on the exposed surface adjacent the slider bearing, the cleaning line being subject to flow of the cleaning fluid to generate turbulence in the boundary layer, dislodging the particles from the boundary layer.

10. The apparatus of claim 9 wherein the cleaning line moves over the exposed surface along a line generally perpendicular to the cleaning line.

11. The apparatus of claim 9 wherein the exposed surface is a sliding surface of a microstructure device for use in a disc drive.

12. The apparatus of claim 9 wherein the microstructure device comprises an array of disc drive heads on a substrate.

13. The apparatus of claim 9 wherein the resilient mounting is movable from a first position over the exposed surface to a second position away from the exposed surface.

14. The apparatus of claim 9 wherein the flow of the cleaning fluid is generated by relative motion between the slider bearing and the exposed surface.

15. The apparatus of claim 9 wherein the cleaning fluid is air.

16. The apparatus of claim 9 wherein the microstructure device comprises a silicon wafer.

17. The apparatus of claim 9 wherein the microstructure device comprises a gallium arsenide wafer.

18. An apparatus adapted to clean an exposed surface of a microstructure device, comprising:

a fixture having a mounting surface adapted to secure the microstructure device;

a cleaning fluid covering the exposed surface;

a slider bearing disposed over the exposed surface;

a resilient mount coupled to the slider bearing; and a cleaning line on the exposed surface adjacent the slider bearing, the cleaning line being subject to flow of the cleaning fluid; and wherein the flow of the cleaning fluid is generated by a pressurized nozzle disposed between the slider bearing and the exposed surface.

19. An apparatus adapted to clean an exposed surface of a microstructure device, comprising:

a fixture having a mounting surface adapted to secure the microstructure device;

a cleaning fluid covering the exposed surface;

a slider bearing disposed over the exposed surface;

a resilient mount coupled to the slider bearing; and a cleaning line on the exposed surface adjacent the slider bearing, the cleaning line being subject to flow of the cleaning fluid; and wherein the cleaning fluid is a liquid subjected to a static pressure during cleaning sufficient to prevent cavitation.

20. An apparatus adapted to clean particles from a boundary layer on an exposed surface of a microstructure device, comprising:

an arrangement of a fixture mounting the microstructure device with its exposed surface covered by a cleaning fluid and a slider bearing forming a gap between the microstructure device and the slider bearing;

means for generating flow of the cleaning fluid along a cleaning line on the exposed surface adjacent the slider bearing to generate turbulence in the boundary layer, dislodging the particles from the boundary layer.

21. The apparatus of claim 20 wherein the cleaning line moves over the exposed surface along a line generally perpendicular to the cleaning line.

22. The apparatus of claim 20 wherein the exposed surface is a sliding surface of a microstructure device for use in a disc drive.

23. The apparatus of claim 20 wherein the microstructure device comprises an array of disc drive heads on a substrate.

* * * * *